United States Patent [19]

Sugawara

[11] Patent Number: 5,303,088
[45] Date of Patent: Apr. 12, 1994

[54] RETROFOCUS TYPE LENS
[75] Inventor: Saburo Sugawara, Kanagawa, Japan
[73] Assignee: Canon Kabushiki Kaisha, Tokyo, Japan
[21] Appl. No.: 961,826
[22] Filed: Oct. 16, 1992
[30] Foreign Application Priority Data
  Oct. 23, 1991 [JP] Japan .................................. 3-275409
[51] Int. Cl.⁵ ............................................. G02B 13/04
[52] U.S. Cl. .................................... 359/753; 359/793
[58] Field of Search ............... 359/748, 753, 793, 754, 359/761, 770–771, 773, 782, 784

[56] References Cited
U.S. PATENT DOCUMENTS

| 2,927,506 | 3/1960 | Determann | 359/753 |
| 3,099,701 | 7/1963 | Merigold | 359/753 |
| 5,134,524 | 7/1992 | Hamano et al. | 359/687 |

FOREIGN PATENT DOCUMENTS
62-32764 2/1987 Japan .

Primary Examiner—Bruce Y. Arnold
Assistant Examiner—James Phan
Attorney, Agent, or Firm—Fitzpatrick, Cella, Harper & Scinto

[57] ABSTRACT

A retrofocus type lens includes, in order from the screen side, a first lens unit having a negative refractive power and a second lens unit having a positive refractive power with a longest air separation in the lens system left therebetween, wherein a lens positioned closest to the screen side in the second lens unit is formed to a meniscus positive lens convex toward the screen side.

25 Claims, 14 Drawing Sheets

RETROFOCUS TYPE LENS

BACKGROUND OF THE INVENTION

Field of the Invention

This invention relates to retrofocus type lenses and, more particularly, to retrofocus type lenses of long back focal distance relative to the focal length of the entire lens system suited to be used in liquid crystal projectors or the like.

Description of the Related Art

Many wide-angle photographic lenses that have long back focal lengths compared with the focal length of the entire lens system, have been proposed in, for example, Japanese Patent Publication No. Sho 62-32768 and so on.

In the wide-angle lenses in the proposals mentioned above, because of their use in photographic purposes, the back focal distance is equal to at most 1.3 times the focal length of the entire lens system. By the way, in recent years, the use of liquid crystal projectors has been widespread and is expanding at ever increasing rates. To apply design principles of the wide-angle lenses to a projection lens, which is of the retrofocus type, requires a shortcoming to be met in that the back focal distance is not long enough.

The projector arrangement usually includes two dichroic mirrors for color composition in between the projection lens and the image to be projected. For this purpose, it is necessary to secure the back focal distance which is at least two times the focal length of the projection lens.

SUMMARY OF THE INVENTION

An object of the invention is to provide a retrofocus type lens whose back focal distance is made longer than two times the focal length of the entire lens system, so that it is suited to be used as the projection lens for a liquid crystal projector, and which is well corrected for all aberrations, while still permitting the bulk and size to be minimized.

In a preferred embodiment according to the invention, a retrofocus type lens comprises, in order from a first conjugate side which is at a long distance (from a screen side), a first lens unit of negative refractive power, and a second lens unit of positive refractive power, with a longest air spacing left therebetween, wherein a lens member closest to the first conjugate side in the second lens unit is a positive meniscus lens convex toward the first conjugate side. With the retrofocus type lens, it is thus made possible to realize the elongation of the back focal distance, a minimization of the bulk and size and improvements of the aberration correction.

DETAILED DESCRIPTION OF THE PREFERRED EMBODIMENTS

Figure 1:
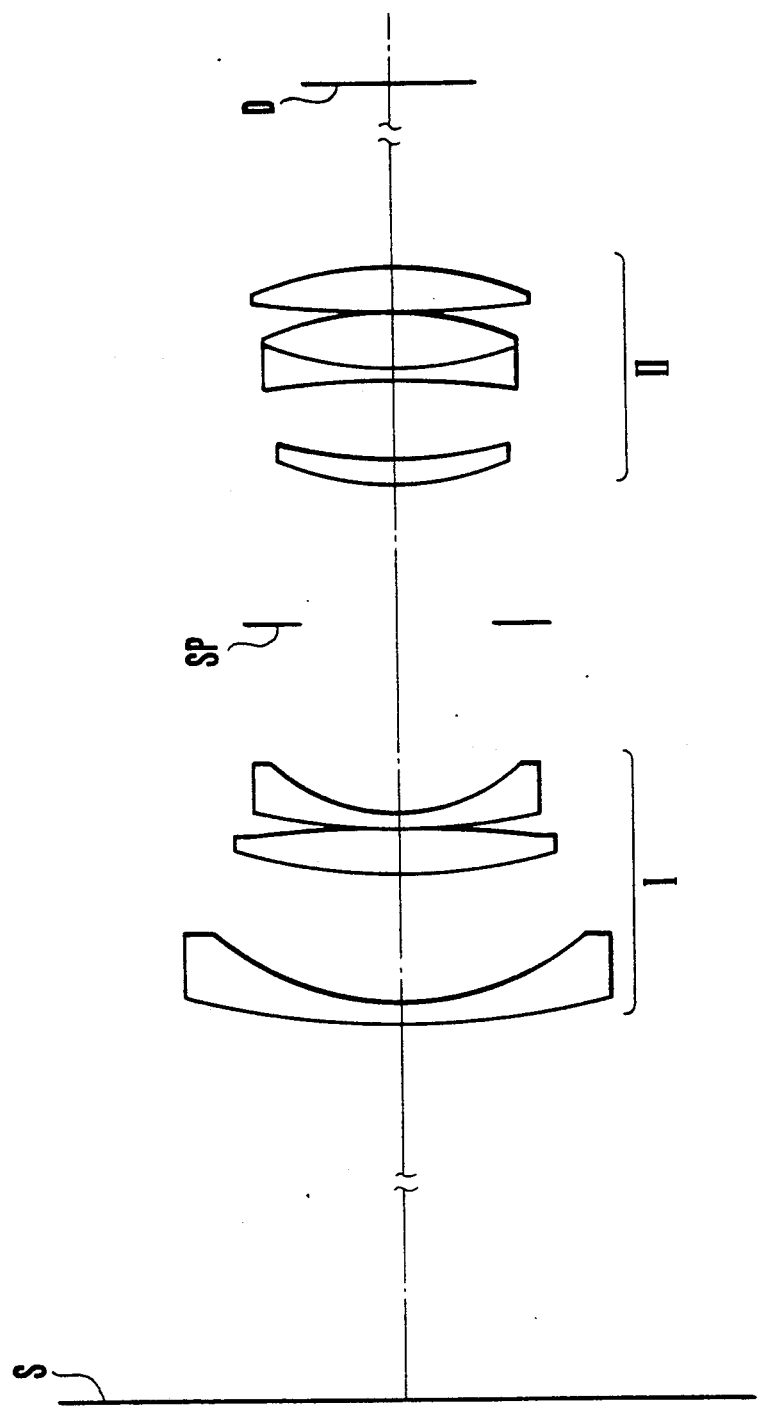
FIG. 1 is a longitudinal section view of a numerical example 1 of a lens of the invention.

Retrofocus type lenses of the invention are next described by reference to the drawings.

FIG. 1, FIG. 3, FIG. 5, FIG. 7, FIG. 9, FIG. 11 and FIG. 13 are lens block diagrams of the numerical examples 1, 2, 3, 4, 5, 6 and 7, respectively. In these drawings, a first lens unit I is arranged on the side of a first conjugate point S of long distance (at which a screen is actually placed, so this point is hereinafter called the "screen"), and has a negative refractive power. A second lens unit II is arranged after the first lens unit I at an interval of the longest air separation in the lens system and has a positive refractive power. SP stands for a flare stopper arranged in between the first and second lens units I and II. A display element D, of the liquid crystal type or the like on which an original image is formed, is arranged on a conjugate point of short distance. With such an arrangement, the image formed on the display element D is projected by the lens system onto the screen S in an enlarged scale.

Now, in the retrofocus type lens comprising, from the screen side, the first lens unit of negative refractive power and the second lens unit of positive refractive power with the longest air spacing left therebetween, in order to reduce the size while maintaining the constant position of the image plane, it may be considered to shorten the spacing between the first and second lens units. If so, the difference between the absolute values of the powers of the first and second lens units has to be increased. This leads to a tendency of over-correction of the image surface, influencing the optical performance. Particularly for correction of the curvature of field, it is preferred that the refractive index of positive lenses in the lens system be lowered, while the refractive index of negative lenses be heightened. Further, in the case of using a cemented lens, the radius of curvature of the cemented surface is made small to increase the difference between the absolute values of the powers of positive and negative elements of this cemented lens.

In the embodiment of the invention, the second lens unit is constructed from, in order from the screen side, a meniscus positive lens convex toward the screen side, a cemented lens composed of a negative lens and a positive lens, and a positive lens. Furthermore, glass materials of a lower refractive index are selected to be used in the positive lenses of the second lens unit, and ones of higher refractive index in the negative lenses.

Thus, the refractive index difference is taken large enough. At the same time, the difference of the Abbe numbers of the positive and negative lenses is made to be small. Thus, the positive and negative lenses each get a large power, and the Petzval sum of the second lens group gets a large value. In such a manner, the image surface is prevented from being over corrected by the influence of the negative first lens unit.

Meanwhile, with the use of a small radius of curvature in the cemented surface of the cemented lens as described before, this cemented surface now tends to over-correct spherical aberration and coma. To correct these aberrations the cemented surface has produced, the meniscus positive lens convex toward the screen side is positioned in the second lens unit at a closest position to the screen side. By this arrangement, the spherical aberration and coma are canceled. Thus, a good correction of image aberrations is realized.

In a preferred embodiment, it is desirable to put the shape factor ($SF_{2f}$) of this meniscus positive lens in the following range:

$$-8 < SF_{2f} < -1 \tag{1}$$

where, when the radii of curvature of the surfaces facing the screen side and the display element side are denoted by $r_{2ff}$ and $r_{2fr}$, respectively, $$SF_{2f} = (r_{2ff} + r_{2fr})/(r_{2ff} - r_{2fr})$$

The inequalities of condition (1) are to determine the shape of the meniscus positive lens. If below the range of the inequalities, the spherical aberration and coma tend to be under-corrected. If above the range of the inequalities, the spherical aberration and coma tend to be over-corrected. In either case, the result is objectionable.

Further, it is desirable to satisfy one of the following conditions:

$$0.7 < r_{ha}/r_{2ff} < 2 \tag{2}$$

where $r_{ha}$ is the radius of curvature of the cemented surface of the cemented lens.

$$n_{2n} - n_{2p} > 0.2 \tag{3}$$

where $n_{2n}$ and $n_{2p}$ are respectively the mean value of the refractive indices of the negative lenses and the mean value of the refractive indices of the positive lenses in the second lens unit.

$$20 < \nu_{2p} - \nu_{2n} < 35 \tag{4}$$

where $\nu_{2n}$ and $\nu_{2p}$ are respectively the mean values of the Abbe numbers of the negative lenses and the positive lenses in the second lens unit.

Furthermore, as to the specific form of the second lens unit, particularly the cemented lens is preferably formed as a positive lens having a convex surface facing the display element side.

Next, the significance of each of the conditions is explained.

The inequalities of condition (2) are concerned with the ratio of the radius of curvature of the cemented surface of the positive cemented lens in the second lens unit to the radius of curvature of the surface facing the screen side of the meniscus positive lens of the second lens unit. If below the range of these inequalities, over-correction of spherical aberration and coma results. If above the range of the inequalities, under-correction of spherical aberration and coma results. In either case, the result is objectionable.

The inequalities of conditions (3) and (4) give ranges for the refractive indices and Abbe numbers of the positive and negative lenses in the second lens unit. If below the range of the inequality of condition (3), over-correction of field curvature results. If below the range of the inequalities of condition (4), large chromatic aberrations are produced. If above the range of the inequalities of condition (4), over-correction of field curvature results. In any case, the result is objectionable.

The foregoing has been described with regard to the second lens unit. Next explanation is given to the first lens unit.

The first lens unit, as shown in numerical examples 1 to 4 and 7, comprises, in order from the screen side, a negative meniscus lens convex toward the screen side, a bi-convex positive lens having a surface of small radius of curvature facing the screen side, and a negative meniscus lens convex toward the screen side. As shown in numerical examples 5 and 6, it may otherwise be constructed from a positive lens arranged in the closest position to the screen side and two negative meniscus lenses.

When employing the former lens arrangement, letting the radii of curvature of the surfaces of the bi-convex lens facing the screen side and the display element side in the first lens unit be denoted by $r_{1mf}$ and $r_{1mr}$, respectively, and putting $$SF_{1m} = (r_{1mf} + r_{1mr})/(r_{1mf} - r_{1mr})$$

it is desirable to satisfy the following condition:

$$-0.9 < SF_{1m} < -0.3 \tag{5}$$

The inequalities of condition (5) are to determine the form of the bi-convex positive lens of the first lens unit. If below the range of the inequalities of the condition, an under-correction of the distortion results. If above the range of the inequalities of the condition, coma becomes difficult to correct. In either case, the results are objectionable.

Next, numerical examples of the invention are shown. In the numerical data for these examples, Ri is the radius of curvature of the i-th lens surface, when counted from the screen side, Di is the i-th lens thickness or air separation, when counted from the screen side, and Ni and $\nu$i are respectively the refractive index and Abbe number of the glass of the i-th lens element, when counted from the screen side.

Figure 2:
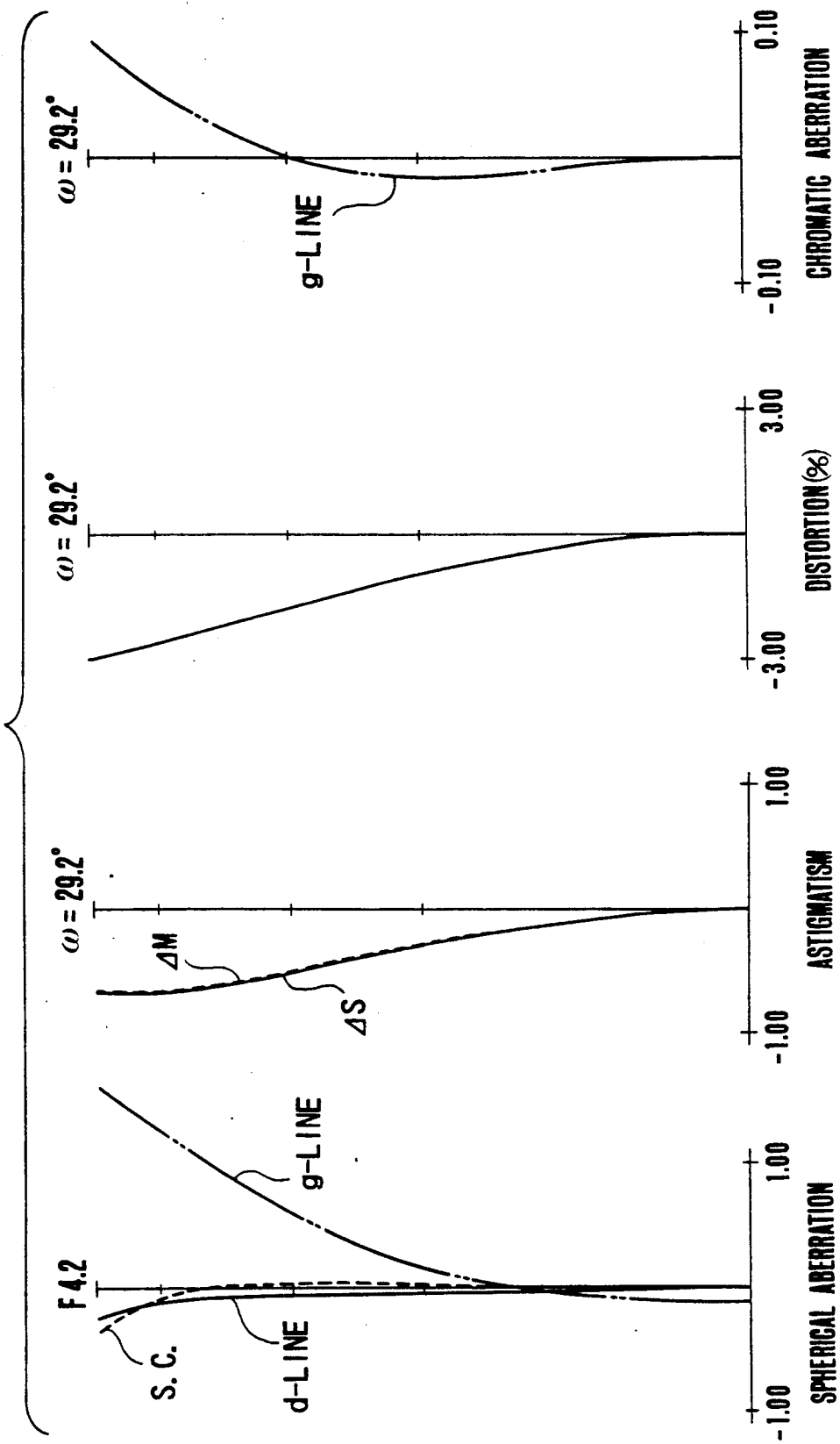
FIG. 2 shows graphic representations of the aberrations of the lens of FIG. 1. (Screen Distance: 2.7 m)
Figure 3:
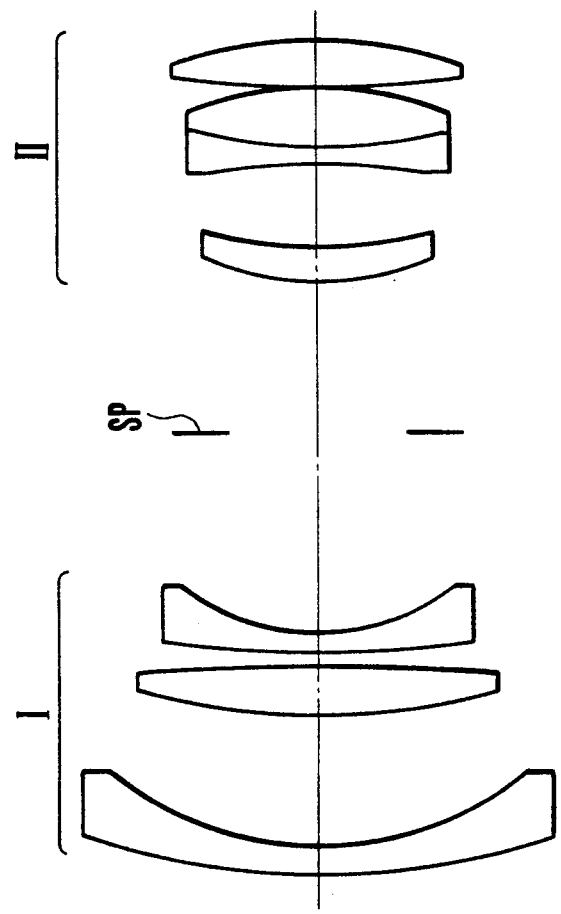
FIG. 3 is a longitudinal section view of a numerical example 2 of a lens of the invention.

| Numerical Example 1 (FIGS. 1 and 2): | | | |
|---|---|---|---|
| F = 86.32 | FNO = 1:4.2 | 2ω = 58.4° | Back Focal Distance: 181.17 |
| R1 = 132.704 | D1 = 4.00 | N1 = 1.51633 | $\nu$1 = 64.2 |
| R2 = 49.500 | D2 = 22.47 | | |
| R3 = 93.927 | D3 = 7.95 | N2 = 1.69895 | $\nu$2 = 30.1 |
| R4 = −326.910 | D4 = 0.20 | | |
| R5 = 153.193 | D5 = 2.60 | N3 = 1.62299 | $\nu$3 = 58.2 |
| R6 = 32.260 | D6 = 33.00 | | |
| R7 = (Stop) | D7 = 24.56 | | |
| R8 = 50.597 | D8 = 5.00 | N4 = 1.51633 | $\nu$4 = 64.2 |
| R9 = 71.406 | D9 = 13.65 | | |
| R10 = −212.394 | D10 = 2.30 | N5 = 1.83400 | $\nu$5 = 37.2 |
| R11 = 62.858 | D11 = 10.40 | N6 = 1.51633 | $\nu$6 = 64.2 |
| R12 = −62.858 | D12 = 0.20 | | |
| R13 = 319.849 | D13 = 7.20 | N7 = 1.51633 | $\nu$7 = 64.2 |

-continued

| | | |
|---|---|---|
| R14 = -71.648 | | |
| SF$_{2f}$ | -5.863 | ... (1) |
| r$_{ha}$/r$_{2ff}$ | 1.242 | ... (2) |
| n$_{2n}$-n$_{2p}$ | 0.31767 | ... (3) |
| ν$_{2p}$-ν$_{2n}$ | 27 | ... (4) |
| SF$_{1m}$ | -0.554 | ... (5) |

Figure 4:
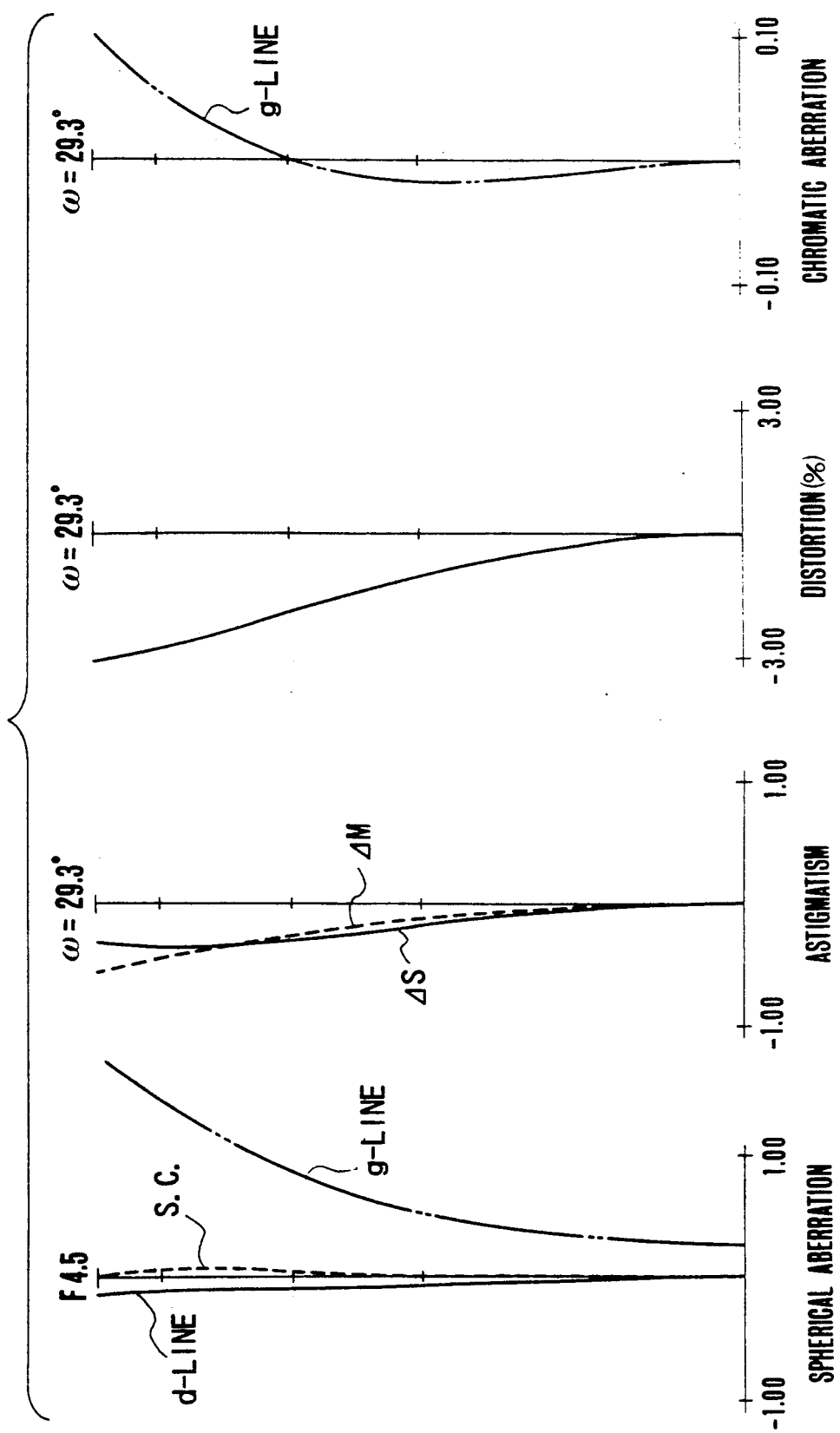
FIG. 4 shows graphic representations of the aberrations of the lens of FIG. 3. (Screen Distance: 2.7 m)
Figure 5:
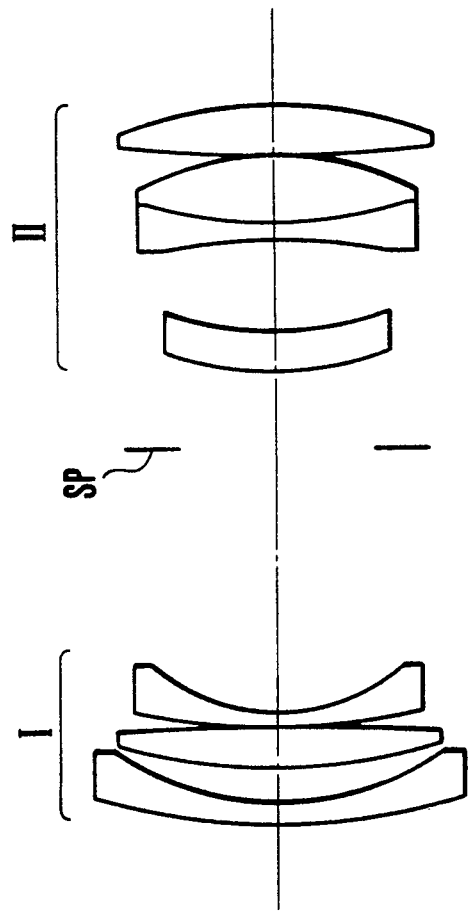
FIG. 5 is a longitudinal section view of a numerical example 3 of a lens of the invention.

Numerical Example 2 (FIGS. 3 and 4):

F = 86.86    FNO = 1:4.5    2ω = 58.6°    Back Focal Distance: 1585.14

| | | | |
|---|---|---|---|
| R1 = 119.374 | D1 = 4.00 | N1 = 1.51633 | ν1 = 64.2 |
| R2 = 51.029 | D2 = 22.13 | | |
| R3 = 98.541 | D3 = 8.27 | N2 = 1.69895 | ν2 = 30.1 |
| R4 = -348.481 | D4 = 2.00 | | |
| R5 = 191.806 | D5 = 2.70 | N3 = 1.62299 | ν3 = 58.2 |
| R6 = 32.121 | D6 = 33.00 | | |
| R7 = (Stop) | D7 = 25.04 | | |
| R8 = 50.950 | D8 = 5.00 | N4 = 1.51633 | ν4 = 64.2 |
| R9 = 72.836 | D9 = 13.54 | | |
| R10 = -165.046 | D10 = 2.30 | N5 = 1.83400 | ν5 = 37.2 |
| R11 = 65.000 | D11 = 10.59 | N6 = 1.51633 | ν6 = 64.2 |
| R12 = -59.089 | D12 = 0.20 | | |
| R13 = 246.760 | D13 = 7.31 | N7 = 1.51633 | ν7 = 64.2 |
| R14 = -73.890 | | | |
| SF$_{2f}$ | -5.656 | | ... (1) |
| r$_{ha}$/r$_{2ff}$ | 1.276 | | ... (2) |
| n$_{2n}$-n$_{2p}$ | 0.31767 | | ... (3) |
| ν$_{2p}$-ν$_{2n}$ | 27 | | ... (4) |
| SF$_{1m}$ | -0.559 | | ... (5) |

Figure 6:
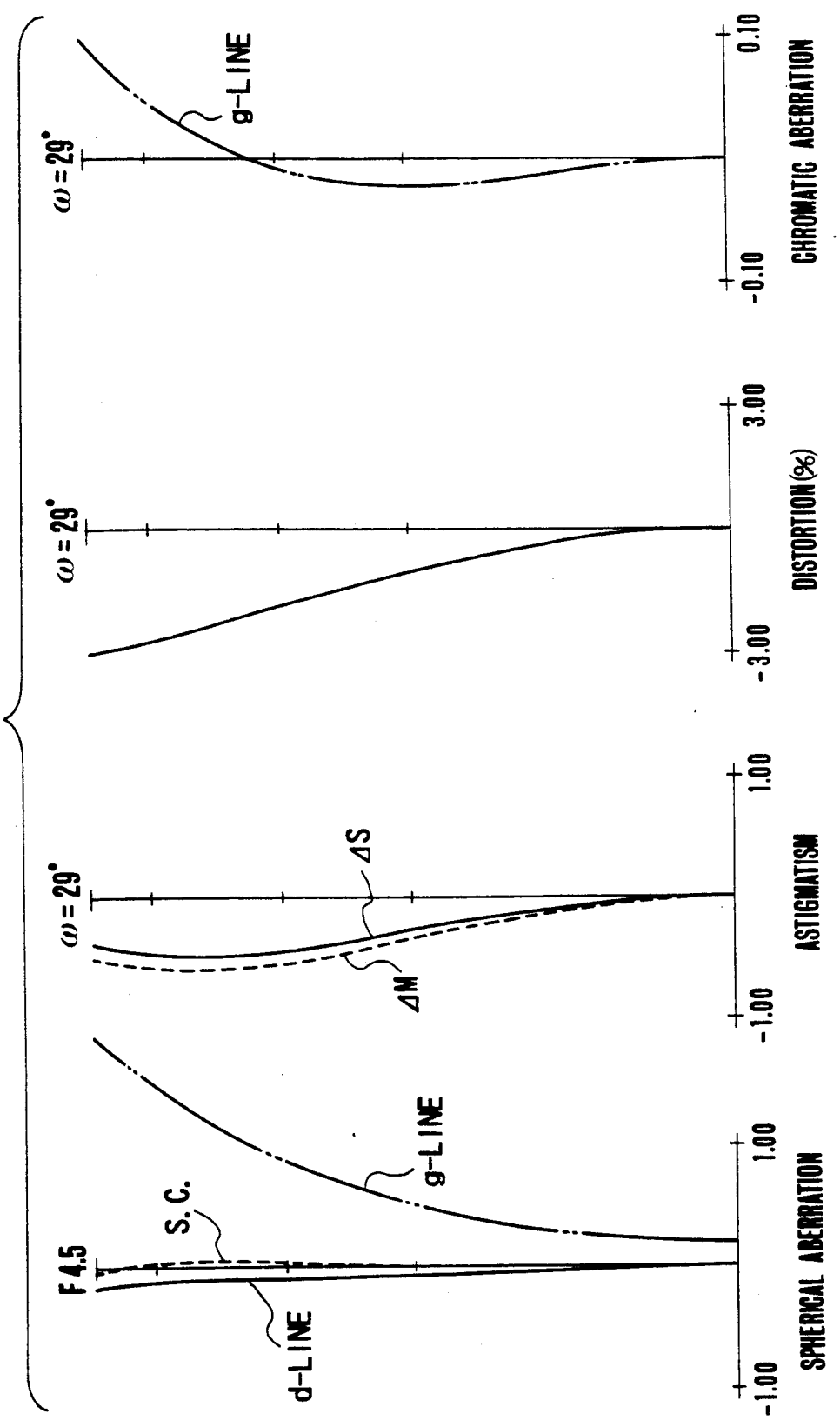
FIG. 6 shows graphic representations of the aberrations of the lens of FIG. 5. (Screen Distance: 2.8 m)
Figure 7:
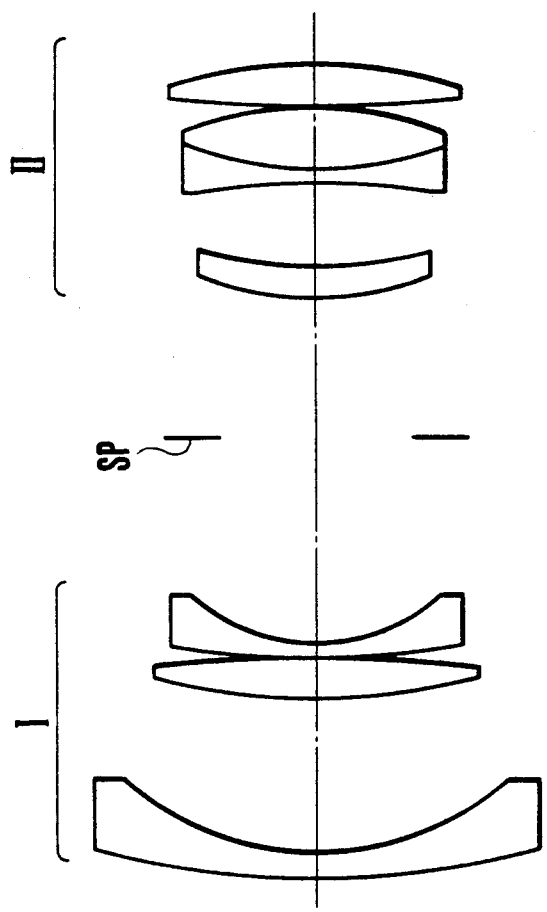
FIG. 7 is a longitudinal section view of a numerical example 4 of a lens of the invention.

Numerical Example 3 (FIGS. 5 and 6):

F = 87.78    FNO = 1:4.5    2ω = 58°    Back Focal Distance: 185.25

| | | | |
|---|---|---|---|
| R1 = 104.161 | D1 = 3.50 | N1 = 1.60311 | ν1 = 60.7 |
| R2 = 45.834 | D2 = 5.86 | | |
| R3 = 91.368 | D3 = 6.90 | N2 = 1.74077 | ν2 = 27.8 |
| R4 = -439.230 | D4 = 0.20 | | |
| R5 = 126.922 | D5 = 2.50 | N3 = 1.71300 | ν3 = 53.8 |
| R6 = 32.094 | D6 = 42.04 | | |
| R7 = (Stop) | D7 = 12.64 | | |
| R8 = 50.938 | D8 = 7.00 | N4 = 1.51633 | ν4 = 64.2 |
| R9 = 76.700 | D9 = 13.84 | | |
| R10 = -140.254 | D10 = 2.50 | N5 = 1.83400 | ν5 = 37.2 |
| R11 = 65.243 | D11 = 11.37 | N6 = 1.51633 | ν6 = 64.2 |
| R12 = -55.187 | D12 = 0.20 | | |
| R13 = 211.026 | D13 = 8.47 | N7 = 1.51633 | ν7 = 64.2 |
| R14 = -74.620 | | | |
| SF$_{2f}$ | -4.955 | | ... (1) |
| r$_{ha}$/r$_{2ff}$ | 1.281 | | ... (2) |
| n$_{2n}$-n$_{2p}$ | 0.31767 | | ... (3) |
| ν$_{2p}$-ν$_{2n}$ | 27 | | ... (4) |
| SF$_{1m}$ | -0.656 | | ... (5) |

Figure 8:
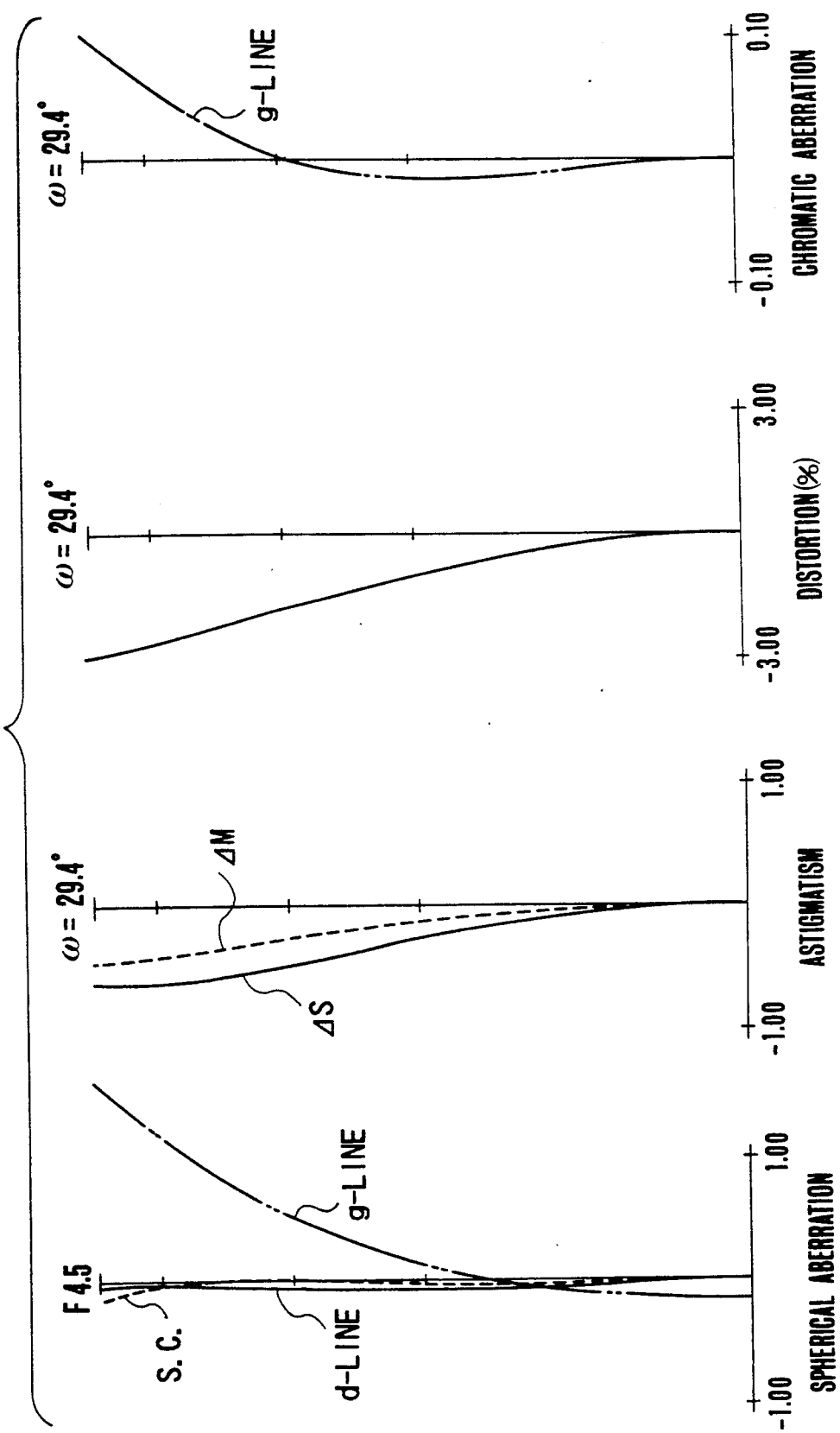
FIG. 8 shows graphic representations of the aberrations of the lens of FIG. 7. (Screen Distance: 2.9 m)
Figure 9:
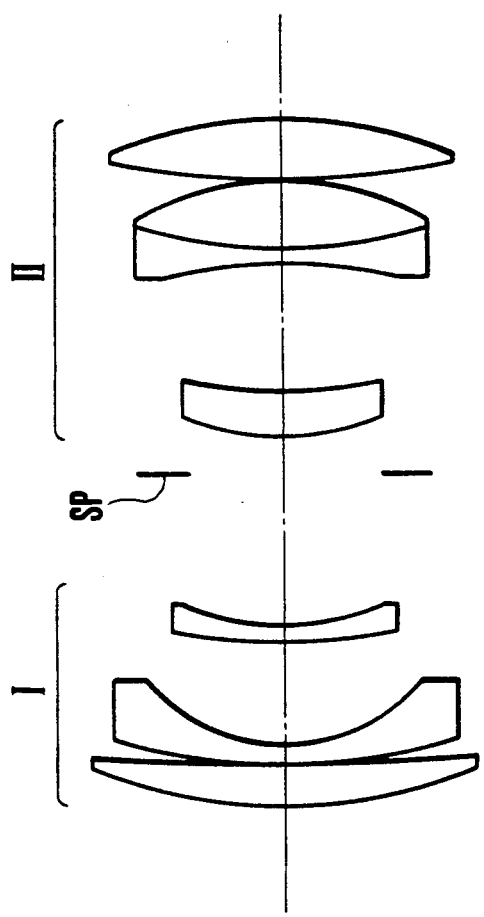
FIG. 9 is a longitudinal section view of a numerical example 5 of a lens of the invention.

Numerical Example 4 (FIGS. 7 and 8):

F = 85.62    FNO = 1:4.5    2ω = 58.8°    Back Focal Distance: 181.44

| | | | |
|---|---|---|---|
| R1 = 128.943 | D1 = 4.00 | N1 = 1.51633 | ν1 = 64.2 |
| R2 = 48.486 | D2 = 25.31 | | |
| R3 = 93.697 | D3 = 7.04 | N2 = 1.69895 | ν2 = 30.1 |
| R4 = -287.518 | D4 = 0.20 | | |
| R5 = 172.051 | D5 = 2.60 | N3 = 1.62299 | ν3 = 58.2 |
| R6 = 31.858 | D6 = 33.00 | | |
| R7 = (Stop) | D7 = 23.10 | | |
| R8 = 48.398 | D8 = 5.00 | N4 = 1.51633 | ν4 = 64.2 |
| R9 = 77.616 | D9 = 13.29 | | |
| R10 = -189.563 | D10 = 2.30 | N5 = 1.80610 | ν5 = 41.0 |
| R11 = 56.755 | D11 = 10.60 | N6 = 1.48749 | ν6 = 70.2 |
| R12 = -56.755 | D12 = 0.20 | | |
| R13 = 256.353 | D13 = 6.86 | N7 = 1.48749 | ν7 = 70.2 |
| R14 = -73.672 | | | |
| SF$_{2f}$ | -4.313 | | ... (1) |
| r$_{ha}$/r$_{2ff}$ | 1.173 | | ... (2) |
| n$_{2n}$-n$_{2p}$ | 0.309 | | ... (3) |
| ν$_{2p}$-ν$_{2n}$ | 27.2 | | ... (4) |
| SF$_{1m}$ | -0.508 | | ... (5) |

Figure 10:
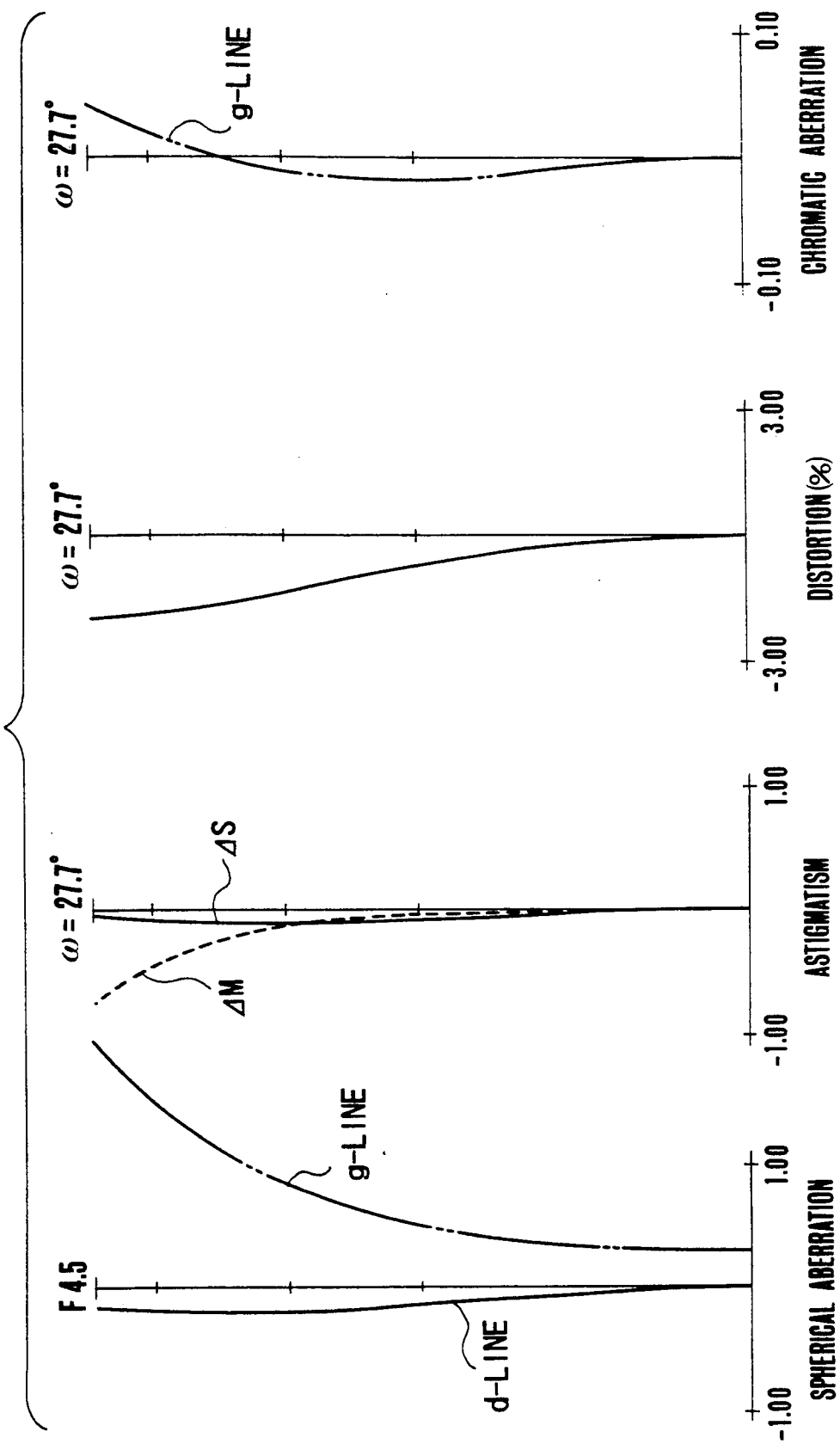
FIG. 10 shows graphic representations of the aberrations of the lens of FIG. 9. (Screen Distance: 2.9 m)
Figure 11:
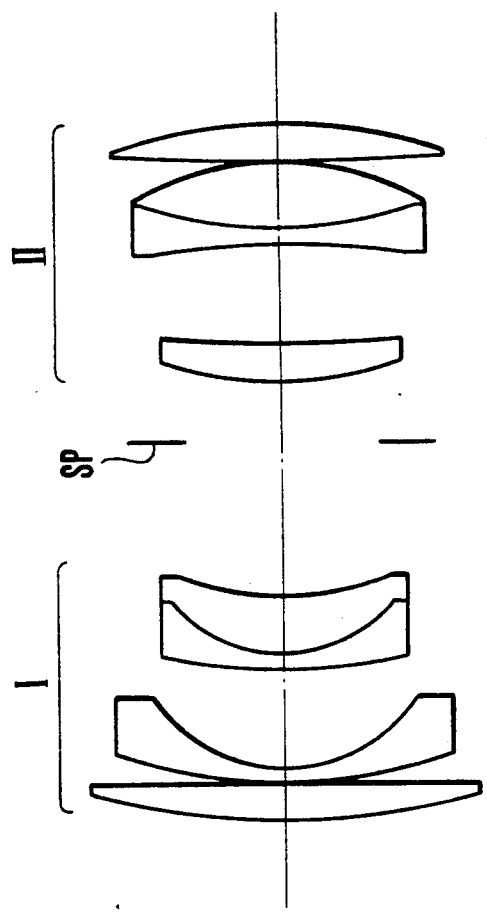
FIG. 11 is a longitudinal section view of a numerical example 6 of a lens of the invention.

Numerical Example 5 (FIGS. 9 and 10):

F = 92.83    FNO = 1:4.5    2ω = 55.4°    Back Focal Distance: 183.93

| | | | |
|---|---|---|---|
| R1 = 77.525 | D1 = 6.67 | N1 = 1.68893 | ν1 = 31.1 |
| R2 = 274.798 | D2 = 0.20 | | |
| R3 = 87.114 | D3 = 3.00 | N2 = 1.51633 | ν2 = 64.2 |
| R4 = 28.232 | D4 = 17.64 | | |
| R5 = 78.913 | D5 = 2.50 | N3 = 1.69680 | ν3 = 55.5 |
| R6 = 36.969 | D6 = 31.22 | | |
| R7 = 51.694 (Stop) | D7 = 7.00 | N4 = 1.51742 | ν4 = 52.4 |
| R8 = 89.910 | D8 = 21.21 | | |
| R9 = -88.376 | D9 = 2.00 | N5 = 1.83400 | ν5 = 37.2 |
| R10 = 79.869 | D10 = 11.64 | N6 = 1.51633 | ν6 = 64.2 |
| R11 = -46.578 | D11 = 0.20 | | |
| R12 = 174.548 | D12 = 9.92 | N7 = 1.51633 | ν7 = 64.2 |
| R13 = -68.838 | | | |
| SF$_{2f}$ | -3.705 | | ... (1) |
| r$_{ha}$/r$_{2ff}$ | 1.545 | | ... (2) |
| n$_{2n}$-n$_{2p}$ | 0.31767 | | ... (3) |
| ν$_{2p}$-ν$_{2n}$ | 27 | | ... (4) |

Figure 12:
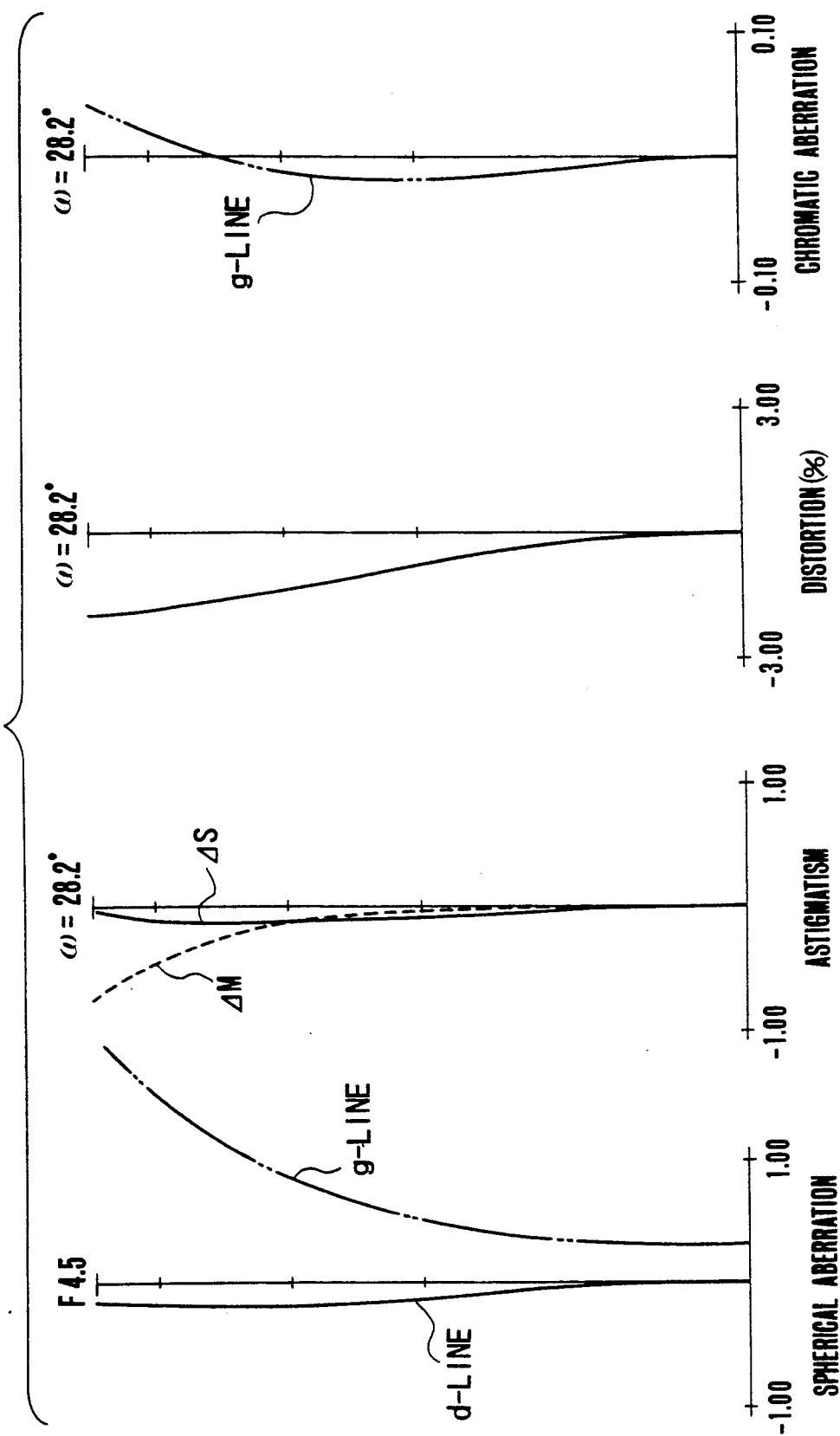
FIG. 12 shows graphic representations of the aberrations of the lens of FIG. 11. (Screen Distance: 2.9 m)
Figure 13:
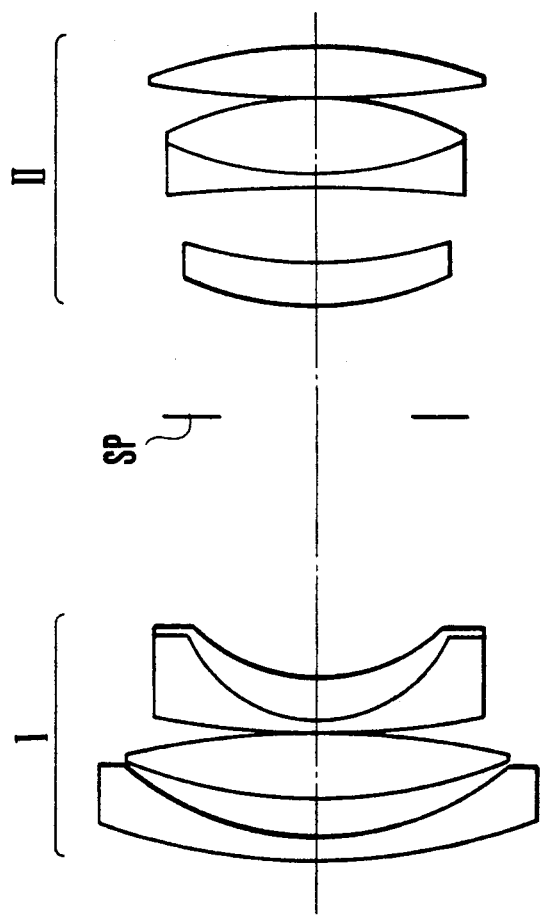
FIG. 13 is a longitudinal section view of a numerical example 7 of a lens of the invention.

Numerical Example 6 (FIGS. 11 and 12):

F = 90.5    FNO = 1:4.5    2ω = 56.4°    Back Focal Distance: 185.19

| | | | |
|---|---|---|---|
| R1 = 111.405 | D1 = 5.87 | N1 = 1.51633 | ν1 = 64.2 |
| R2 = 1634.497 | D2 = 0.20 | | |
| R3 = 77.010 | D3 = 3.00 | N2 = 1.60311 | ν2 = 60.7 |
| R4 = 28.269 | D4 = 15.90 | | |
| R5 = 113.065 | D5 = 2.50 | N3 = 1.60311 | ν3 = 60.7 |
| R6 = 22.583 | D6 = 9.08 | N4 = 1.64769 | ν4 = 33.8 |
| R7 = 40.680 | D7 = 25.48 | | |
| R8 = (Stop) | D8 = 10.00 | | |
| R9 = 55.656 | D9 = 6.24 | N5 = 1.51633 | ν5 = 64.2 |
| R10 = 244.093 | D10 = 16.09 | | |
| R11 = -137.776 | D11 = 2.20 | N6 = 1.83400 | ν6 = 37.2 |
| R12 = 60.626 | D12 = 10.79 | N7 = 1.51633 | ν7 = 64.2 |
| R13 = -49.064 | D13 = 0.20 | | |
| R14 = 286.700 | D14 = 6.32 | N8 = 1.51633 | ν8 = 64.2 |
| R15 = -86.375 | | | |
| SF$_{2f}$ | -1.591 | | ... (1) |
| r$_{ha}$/r$_{2ff}$ | 1.089 | | ... (2) |
| n$_{2n}$-n$_{2p}$ | 0.31767 | | ... (3) |
| ν$_{2p}$-ν$_{2n}$ | 27 | | ... (4) |

Figure 14:
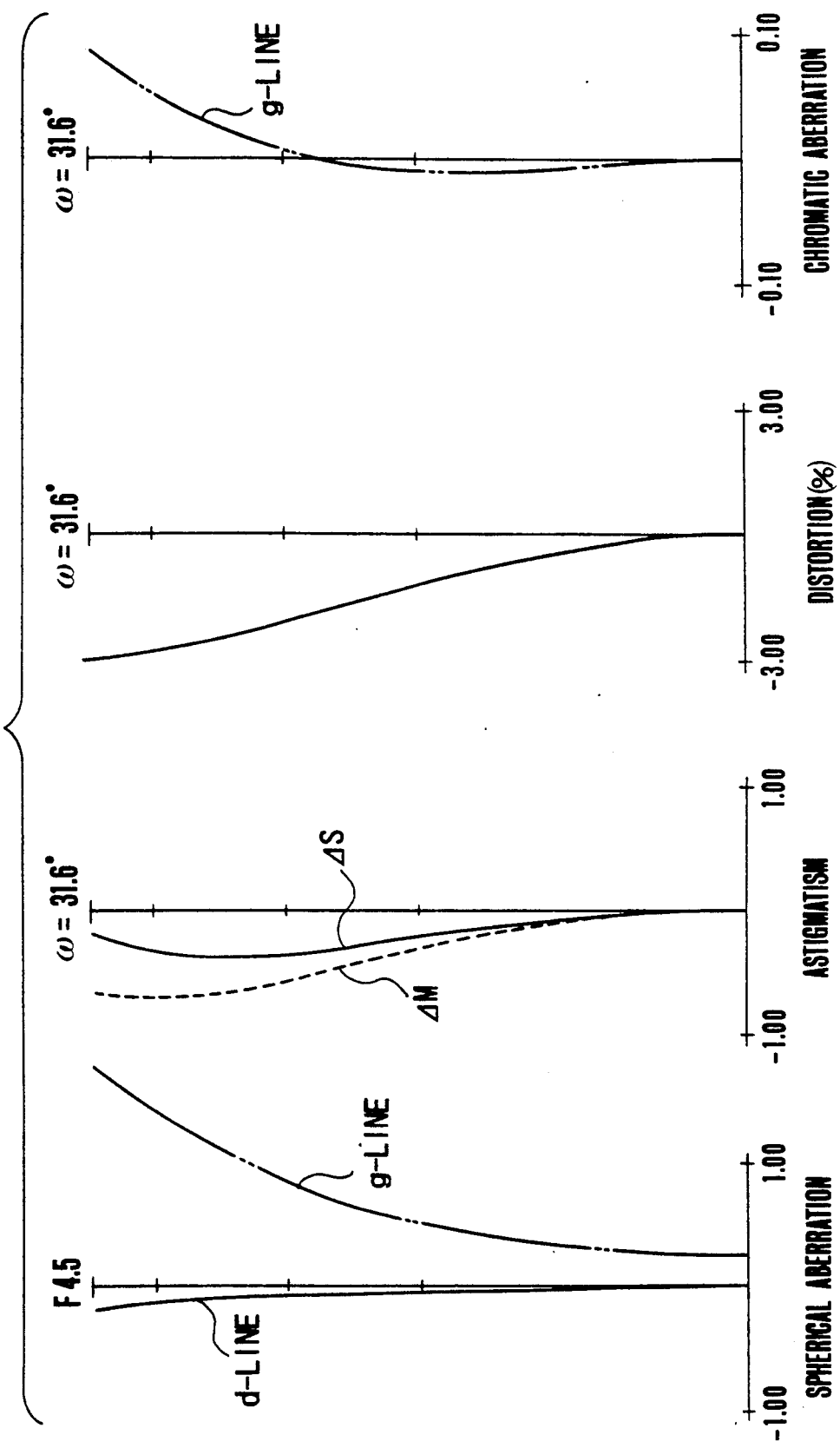
FIG. 14 shows graphic representations of the aberrations of the lens of FIG. 13. (Screen Distance: 2.5 m)

Numerical Example 7 (FIGS. 13 and 14):

F = 78.93    FNO = 1:4.5    2ω = 63.2°    Back Focal Distance: 185.51

| | | | |
|---|---|---|---|
| R1 = 110.660 | D1 = 3.50 | N1 = 1.71300 | ν1 = 53.8 |
| R2 = 48.636 | D2 = 5.97 | | |
| R3 = 82.367 | D3 = 10.48 | N2 = 1.51742 | ν2 = 52.4 |
| R4 = -189.661 | D4 = 0.18 | | |
| R5 = 140.095 | D5 = 2.50 | N3 = 1.77250 | ν3 = 49.6 |
| R6 = 23.552 | D6 = 7.55 | N4 = 1.80518 | ν4 = 25.4 |
| R7 = 31.533 | D7 = 41.81 | | |
| R8 = (Stop) | D8 = 18.23 | | |
| R9 = 51.710 | D9 = 7.00 | N5 = 1.51633 | ν5 = 64.2 |
| R10 = 88.486 | D10 = 11.85 | | |
| R11 = -239.017 | D11 = 2.50 | N6 = 1.83400 | ν6 = 37.2 |
| R12 = 56.551 | D12 = 12.29 | N7 = 1.51633 | ν7 = 64.2 |
| R13 = -59.084 | D13 = 0.20 | | |
| R14 = 198.283 | D14 = 7.96 | N8 = 1.51633 | ν8 = 64.2 |
| R15 = -88.221 | | | |
| SF$_{2f}$ | -3.812 | | ... (1) |
| r$_{ha}$/r$_{2ff}$ | 1.094 | | ... (2) |
| n$_{2n}$-n$_{2p}$ | 0.31767 | | ... (3) |
| ν$_{2p}$-ν$_{2n}$ | 27 | | ... (4) |

As has been described above, according to the invention, it is possible to provide a retrofocus type lens having a small number of lens elements in compact form, and having various aberrations corrected for good performance so that it is suited to be used as a lens for a liquid crystal projector that requires a long back focal distance. Also, be setting forth the proper features for the refractive indices and Abbe numbers and the forms of the lenses in the second lens unit, the Petzval sum of the second lens unit can be increased from the conventional one. Therefore, without using a glass of high refractive index which is expensive in the negative lenses of the first lens unit, it is possible for the retrofocus type lens to have little field curvature, a small size and a good performance. Also, if a high refractive index glass is used in the negative lenses of the first lens unit, it will become possible to increase the field of view by using a smaller number of lens elements than the is conventional.

What is claimed is:

1. A retrofocus type lens comprising, from a first conjugate side of long distance to a second conjugate side of short distance, a first lens unit having a negative refractive power and a second lens unit comprising positive and negative lenses, said second lens unit having an overall positive refractive power with a longest air separation in the lens system left between said first lens unit and said second lens unit, wherein a lens positioned closest to the first conjugate side in said second lens unit is constructed from a meniscus positive lens convex toward the first conjugate side, and wherein said retrofocus type lens satisfies the following condition:

$$n_{2n} - n_{2p} > 0.2$$

where $n_{2p}$ and $n_{2n}$ are respectively mean values of refractive indices of said positive and negative lenses in said second lens unit.

2. A retrofocus type lens according to claim 1, satisfying the following condition:

$$-8 < SF_{2f} < -1$$

where $SF_{2f} = (r_{2ff} + r_{2fr})/(r_{2ff} - r_{2fr})$ wherein $r_{2ff}$ and $r_{2fr}$ are the radii of curvature of lens surfaces facing the first conjugate side and the second conjugate side of said meniscus positive lens, respectively.

3. A retrofocus type lens according to claim 1, wherein said second lens unit comprises a cemented lens having a negative lens and a positive lens on the second conjugate side of said meniscus positive lens, and satisfying the following conditions:

$$0.7 < r_{ha}/r_{2ff} < 2$$

where $r_{ha}$ and $r_{2ff}$ are radii of curvature of a cemented surface of said cemented lens and of a first conjugate side of said meniscus positive lens, respectively.

4. A retrofocus type lens according to claim 1, satisfying the following condition:

$$20 < \nu_{2p} - \nu_{2n} < 35$$

where $\nu_{2p}$ and $\nu_{2n}$ are respectively mean values of Abbe numbers of the positive and negative lenses in said second lens unit.

5. A retrofocus type lens according to claim 1, wherein said second lens unit comprises, in order from the first conjugate side, said meniscus positive lens, a cemented lens having a convex surface facing the second conjugate side and composed of a negative lens and a positive lens, and a bi-convex lens.

6. A retrofocus type lens according to claim 1, wherein said first lens unit comprises, in order from the first conjugate side, a negative meniscus lens convex toward the first conjugate side, a bi-convex positive lens having a lens surface of small radius of curvature facing the first conjugate side, and a negative meniscus lens convex toward the first conjugate side.

7. A retrofocus type lens according to claim 6, satisfying the following condition:

$$-0.9 < SF_{1m} < -0.3$$

where $SF_{1m} = (r_{1mf} + r_{1mr})/(r_{1mf} - r_{1mr})$ wherein $r_{1mf}$ and $r_{1mr}$ are the radii of curvature of lens surfaces facing the first conjugate side and the second conjugate side of said bi-convex positive lens in said first lens unit, respectively.

8. A retrofocus type lens comprising, from a first conjugate side of long distance to a second conjugate side of short distance, a first lens unit having a negative refractive power and a second lens unit comprising positive and negative lenses, said second lens unit having an overall positive refractive power with a longest air separation in the lens system left between said first lens unit and said second lens unit, wherein a lens positioned closest to the first conjugate side in said second lens unit is constructed from a meniscus positive lens convex toward the first conjugate side, and wherein said retrofocus type lens satisfies the following condition:

$$20 < \nu_{2p} - \nu_{2n} < 35$$

where $\nu_{2p}$ and $\nu_{2n}$ are respectively mean values of Abbe numbers of said positive and negative lenses in said second lens unit.

9. A retrofocus type lens according to claim 8, satisfying the following condition:

$$-8 < SF_{2f} < -1$$

where $SF_{2f} = (r_{2ff} + r_{2fr})/(r_{2ff} - r_{2fr})$ wherein $r_{2ff}$ and $r_{2fr}$ are radii of curvature of lens surfaces facing the first conjugate side and the second conjugate side of said meniscus positive lens, respectively.

10. A retrofocus type lens according to claim 8, wherein said second lens unit comprises a cemented lens having a negative lens and a positive lens on the second conjugate side of said meniscus positive lens, and satisfying the following condition:

$$0.7 < r_{ha}/r_{2ff} < 2$$

where $r_{ha}$ and $r_{2ff}$ are radii of curvature of a cemented surface of said cemented lens and of a first conjugate side of said meniscus positive lens, respectively.

11. A retrofocus type lens according to claim 8, satisfying the following condition:

$$n_{2n} - n_{2p} > 0.2$$

where $n_{2p}$ and $n_{2n}$ are respectively mean values of refractive indices of said positive and negative lenses in said second lens unit.

12. A retrofocus type lens according to claim 8, wherein said second lens unit comprises, in order from the first conjugate side, said meniscus positive lens, a cemented lens having a convex surface facing the second conjugate side and composed of a negative lens and a positive lens, and a bi-convex lens.

13. A retrofocus type lens according to claim 8, wherein said first lens unit comprises, in order from the first conjugate side, a negative meniscus lens convex toward the first conjugate side, a bi-convex positive lens having a lens surface of small radius of curvature facing the first conjugate side, and a negative meniscus lens convex toward the first conjugate side.

14. A retrofocus type lens comprising, from a first conjugate side of long distance to a second conjugate side of short distance, a first lens unit having a negative refractive power and a second lens unit having a positive refractive power with a longest air separation in the lens system left therebetween, wherein a lens positioned closest to the first conjugate side in said second lens unit is constructed from a meniscus positive lens convex toward the first conjugate side, and wherein said second lens unit comprises, in order from the first conjugate side, said meniscus positive lens, a cemented lens having a convex surface facing the second conjugate side and composed of a negative lens and a positive lens, and a bi-convex lens.

15. A retrofocus type lens according to claim 14, satisfying the following condition:

$$-8 < SF_{2f} < -1$$

where $SF_{2f} = (r_{2ff} + r_{2fr})/(r_{2ff} - r_{2fr})$ wherein $r_{2ff}$ and $r_{2fr}$ are radii of curvature of lens surfaces facing the first conjugate side and the second conjugate side of said meniscus positive lens, respectively.

16. A retrofocus type lens according to claim 14, wherein said second lens unit comprises a cemented lens having a negative lens and a positive lens on the second conjugate side of said meniscus positive lens, and satisfying the following condition:

$$0.7 < r_{ha}/r_{2ff} < 2$$

where $r_{ha}$ and $r_{2ff}$ are radii of curvature of a cemented surface of said cemented lens and of a first conjugate side of said meniscus positive lens, respectively.

17. A retrofocus type lens according to claim 14, satisfying the following condition:

$$n_{2n} - n_{2p} > 0.2$$

where $n_{2p}$ and $n_{2n}$ are respectively mean values of refractive indices of said positive and negative lenses in said second lens unit.

18. A retrofocus type lens according to claim 14, satisfying the following condition:

$$20 < \nu_{2p} - \nu_{2n} < 35$$

where $\nu_{2p}$ and $\nu_{2n}$ are respectively mean values of Abbe numbers of said positive and negative lenses in said second lens unit.

19. A retrofocus type lens according to claim 14, wherein said first lens unit comprises, in order from the first conjugate side, a negative meniscus lens convex toward the first conjugate side, a bi-convex positive lens having a lens surface of small radius of curvature facing the first conjugate side, and a negative meniscus lens convex toward the first conjugate side.

20. A retrofocus type lens comprising, from a first conjugate side of long distance to a second conjugate side of short distance, a first lens unit having a negative refractive power and a second lens unit having a positive refractive power with a longest air separation in the lens system left therebetween, wherein a lens positioned closest to the first conjugate side in said second lens unit is constructed from a meniscus positive lens convex toward the first conjugate side, and wherein said first lens unit comprises, in order from the first conjugate side, a negative meniscus lens convex toward the first conjugate side, a bi-convex positive lens having a lens surface of small radius of curvature facing the first conjugate side, and a negative meniscus lens convex toward the first conjugate side.

21. A retrofocus type lens according to claim 20, satisfying the following condition:

$$-8 < SF_{2f} < -1$$

where $SF_{2f} = (r_{2ff} + r_{2fr})/(r_{2ff} - r_{2fr})$ wherein $r_{2ff}$ and $r_{2fr}$ are radii of curvature of lens surfaces facing the first conjugate side and the second conjugate side of said meniscus positive lens, respectively.

22. A retrofocus type lens according to claim 20, wherein said second lens unit comprises a cemented lens having a negative lens and a positive lens on the second conjugate side of said meniscus positive lens, and satisfying the following condition:

$$0.7 < r_{ha}/r_{2ff} < 2$$

where $r_{ha}$ and $r_{2ff}$ are radii of curvature of a cemented surface of said cemented lens and of a first conjugate side of said meniscus positive lens, respectively.

23. A retrofocus type lens according to claim 20, wherein said second lens unit comprises positive and negative lenses, said retrofocus type lens satisfying the following condition:

$$n_{2n} - n_{2p} > 0.2$$

where $n_{2p}$ and $n_{2n}$ are respectively mean values of refractive indices of the positive and negative lenses in said second lens unit.

24. A retrofocus type lens according to claim 20, wherein said second lens unit comprises positive and negative lenses, said retrofocus type lens satisfying the following condition:

$$20 < \nu_{2p} - \nu_{2n} < 35$$

where $\nu_{2p}$ and $\nu_{2n}$ are respectively mean values of Abbe numbers of the positive and negative lenses in said second lens unit.

25. A retrofocus type lens according to claim 20, wherein said second lens unit comprises, in order from the first conjugate side, said meniscus positive lens, a cemented lens having a convex surface facing the second conjugate side and composed of a negative lens and a positive lens, and a bi-convex lens.

* * * * *

UNITED STATES PATENT AND TRADEMARK OFFICE
CERTIFICATE OF CORRECTION

PATENT NO. : 5,303,088
DATED : April 12, 1994
INVENTOR(S) : Saburo SUGAWARA

It is certified that error appears in the above-indentified patent and that said Letters Patent is hereby corrected as shown below:

COLUMN 3
    Line 7, "over corrected" should read --over-corrected--.

COLUMN 5
    Line 56, "$\nu$ 5" should read --$\nu$5--.

COLUMN 6
    Line 39, "R3=82.367" should read --R3=81.367--.

COLUMN 7
    Line 4, "the" should be deleted; and
    Line 39, "conditions:" should read --condition:--.

Signed and Sealed this

Eighth Day of November, 1994

Attest:

BRUCE LEHMAN

*Attesting Officer*     *Commissioner of Patents and Trademarks*